United States Patent
Kuge et al.

(10) Patent No.: US 11,703,465 B2
(45) Date of Patent: Jul. 18, 2023

(54) APPARATUS FOR INSPECTING SEMICONDUCTOR DEVICE AND METHOD FOR INSPECTING SEMICONDUCTOR DEVICE

(71) Applicant: Kioxia Corporation, Tokyo (JP)

(72) Inventors: Nobuhito Kuge, Yokkaichi (JP); Toshihisa Fujiwara, Yokkaichi (JP); Yui Fujiwara, Yokkaichi (JP); Chisaki Usui, Kuwana (JP)

(73) Assignee: Kioxia Corporation, Tokyo (JP)

( * ) Notice: Subject to any disclaimer, the term of this patent is extended or adjusted under 35 U.S.C. 154(b) by 353 days.

(21) Appl. No.: 17/168,491

(22) Filed: Feb. 5, 2021

(65) Prior Publication Data

US 2022/0065802 A1 Mar. 3, 2022

(30) Foreign Application Priority Data

Sep. 2, 2020 (JP) .................................. 2020-147461

(51) Int. Cl.
*G01N 23/207* (2018.01)
*G01N 23/2055* (2018.01)

(52) U.S. Cl.
CPC ....... *G01N 23/207* (2013.01); *G01N 23/2055* (2013.01); *G01N 2223/0561* (2013.01); *G01N 2223/0566* (2013.01); *G01N 2223/1016* (2013.01); *G01N 2223/3037* (2013.01); *G01N 2223/331* (2013.01); *G01N 2223/3308* (2013.01); *G01N 2223/403* (2013.01);

(Continued)

(58) Field of Classification Search
None
See application file for complete search history.

(56) References Cited

U.S. PATENT DOCUMENTS

| 3,997,368 A | 12/1976 | Petroff et al. |
|---|---|---|
| 5,506,672 A | 4/1996 | Moslehi |

(Continued)

FOREIGN PATENT DOCUMENTS

| JP | 6-331573 A | 12/1994 |
|---|---|---|
| JP | 2006-58241 A | 3/2006 |

(Continued)

*Primary Examiner* — Thomas R Artman
(74) *Attorney, Agent, or Firm* — Oblon, McClelland, Maier & Neustadt, L.L.P.

(57) ABSTRACT

An apparatus for inspecting a semiconductor device according to an embodiment includes an X-ray irradiation unit configured to make monochromatic X-rays obliquely incident on the semiconductor device, which is an object at a predetermined angle of incidence, a detection unit configured to detect observed X-rays observed from the object using a plurality of two-dimensionally disposed photodetection elements, an analysis apparatus configured to generate X-ray diffraction images obtained by photoelectrically converting the observed X-rays, and a control unit configured to change an angle of incidence and a detection angle of the X-rays, in which the analysis apparatus acquires an X-ray diffraction image every time the angle of incidence is changed, extracts a peak X-ray diffraction image, X-ray intensity of which becomes maximum for each of pixels and compares the peak X-ray diffraction image among the pixels to thereby estimate a stress distribution of the object.

20 Claims, 14 Drawing Sheets

(52) U.S. Cl.
CPC .............. *G01N 2223/607* (2013.01); *G01N 2223/6116* (2013.01)

(56) References Cited

U.S. PATENT DOCUMENTS

| | | | |
|---|---|---|---|
| 6,385,289 B1 * | 5/2002 | Kikuchi | G01N 23/20 378/70 |
| 8,855,266 B2 * | 10/2014 | Yasukawa | G01N 23/207 378/63 |
| 9,431,270 B2 | 8/2016 | Nakazawa et al. | |
| 9,658,174 B2 | 5/2017 | Omote et al. | |
| 9,850,568 B2 | 12/2017 | Sun et al. | |
| 10,119,188 B2 | 11/2018 | Sun et al. | |
| 10,501,843 B2 | 12/2019 | Sun et al. | |
| 10,876,978 B2 * | 12/2020 | Ogata | G01N 23/20025 |
| 2012/0281814 A1 * | 11/2012 | Yokhin | G01N 23/207 378/73 |
| 2013/0039469 A1 * | 2/2013 | Yasukawa | G01N 23/207 378/63 |
| 2016/0240768 A1 | 8/2016 | Fujii et al. | |
| 2019/0214541 A1 | 7/2019 | Fujii et al. | |
| 2019/0227005 A1 * | 7/2019 | Ogata | G01N 23/207 |
| 2020/0087776 A1 | 3/2020 | Sun et al. | |
| 2022/0065802 A1 * | 3/2022 | Kuge | G01N 23/2055 |

FOREIGN PATENT DOCUMENTS

| | | | | |
|---|---|---|---|---|
| JP | 3944330 B2 * | 7/2007 | | G01N 23/20 |
| JP | 5232373 B2 | 7/2013 | | |
| JP | 6025211 B2 | 11/2016 | | |

\* cited by examiner

APPARATUS FOR INSPECTING SEMICONDUCTOR DEVICE AND METHOD FOR INSPECTING SEMICONDUCTOR DEVICE

CROSS-REFERENCE TO RELATED APPLICATIONS

This application is based upon and claims the benefit of priority from the prior Japanese Patent Application No. 2020-147461 filed on Sep. 2, 2020; the entire contents of which are incorporated herein by reference.

FIELD

Embodiments described herein relate generally to an apparatus for inspecting a semiconductor device and a method for inspecting a semiconductor device.

BACKGROUND

Inspection apparatuses using Raman spectroscopy and inspection apparatuses using X-ray diffraction are known as apparatuses for inspecting stress of a semiconductor substrate in which a semiconductor element such as a non-volatile memory is formed.

DETAILED DESCRIPTION

An apparatus for inspecting a semiconductor device according to the present embodiment includes an X-ray irradiation unit configured to make monochromatic X-rays obliquely incident on an object at a predetermined angle of incidence, the object being a semiconductor device, the semiconductor device including a semiconductor substrate, a predetermined pattern being formed on a surface of the semiconductor substrate, and a detection unit configured to detect observed X-rays observed from the object when the monochromatic X-rays are made obliquely incident using a plurality of two-dimensionally disposed photodetection elements. The apparatus also includes an analysis unit configured to generate X-ray diffraction images obtained by photoelectrically converting the observed X-rays and a control unit configured to control the X-ray irradiation unit to change the angle of incidence of the monochromatic X-rays on the object and change a detection angle of the observed X-rays by the plurality of photodetection elements in the detection unit in accordance with the angle of incidence. The detection unit detects the observed X-rays every time the angle of incidence is changed, the analysis unit acquires one of the X-ray diffraction images every time the angle of incidence is changed, and further the analysis unit identifies an X-ray diffraction image in which intensity of the observed X-rays becomes maximum as a maximum intensity image from among the X-ray diffraction images for each of pixels constituting the X-ray diffraction images and compares conditions for acquiring one of the X-ray diffraction images including at least the identified maximum intensity image among the pixels.

Hereinafter, embodiments of the present invention will be described with reference to the accompanying drawings.

Figure 1:
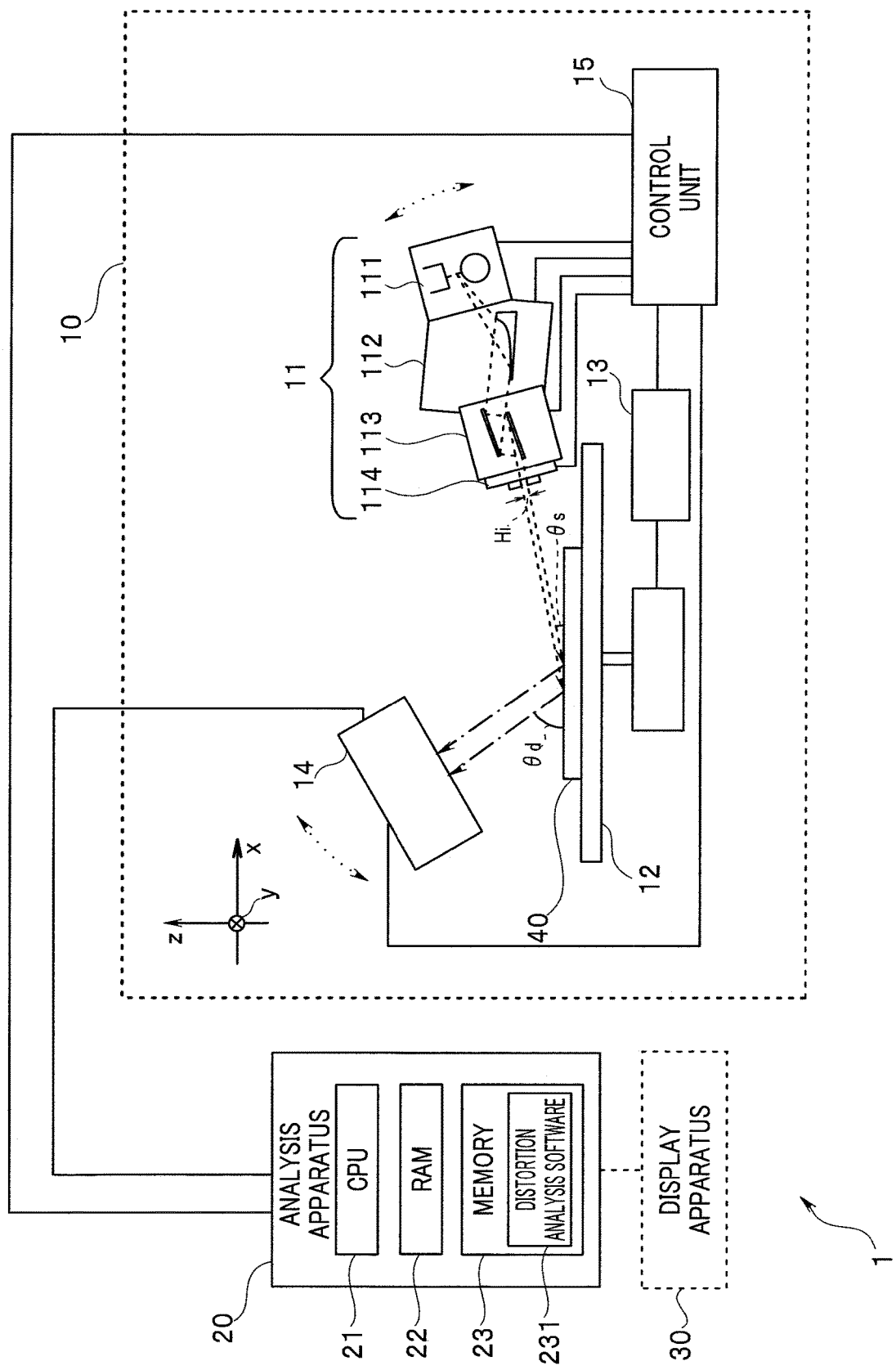
FIG. 1 is a block diagram illustrating a configuration example of an inspection apparatus according to an embodiment.

FIG. 1 is a block diagram illustrating a configuration example of an inspection apparatus according to the present embodiment. An inspection apparatus 1 of the present embodiment includes an X-ray diffraction measuring apparatus 10 and an analysis apparatus 20 and is used to measure a stress distribution of a semiconductor device, which is an object 40 (e.g., silicon wafer in which a pattern such as a memory cell array of a NAND memory with a three-dimensional structure is formed) and observe the stress distribution as two-dimensional mapping information. Note that the inspection apparatus 1 may further include a display apparatus 30 configured to display information relating to the measured stress distribution (e.g., two-dimensional mapping image of stress or the like) or data acquired during measurement.

The X-ray diffraction measuring apparatus 10 irradiates an inspection region of the object 40 with monochromatized X-rays having good parallelism and measures intensity of the diffraction X-rays (diffracted light intensity) generated from the object 40 using an X-ray camera. By scanning and measuring the angle of incidence of X-rays, it is possible to acquire a variation characteristic (rocking curve) of diffracted light intensity on an angle of incidence for each pixel of the X-ray camera. The X-ray diffraction measuring apparatus 10 includes an X-ray irradiation unit 11, an object stage 12, a stage drive unit 13, an X-ray detection camera 14 and a control unit 15.

Figure 2:
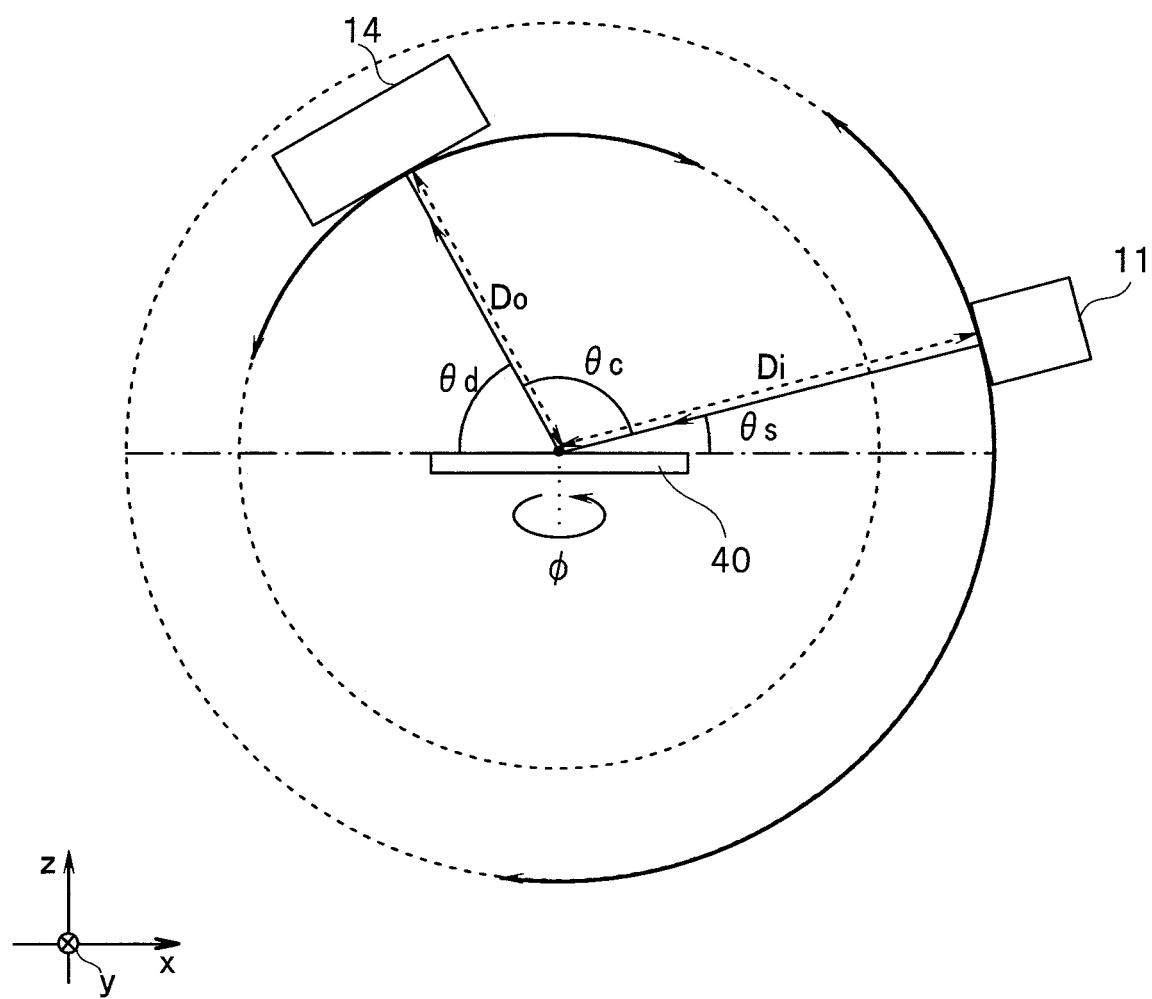
FIG. 2 is a schematic diagram describing a positional relationship among an X-ray irradiation unit, an object and an X-ray detection camera.

The X-ray irradiation unit 11 is mainly constructed of an X-ray source 111, a multilayer film condensing mirror 112, a monochromator 113 and a slit 114. The X-ray source 111 includes, for example, a rotating cathode type target (e.g., Cu, Mo) and a filament for generating an electron beam. The target is irradiated with the electron beam generated from the filament and accelerated by a high voltage, and X-rays are thereby emitted from the target metal. The multilayer film condensing mirror 112 monochromatizes and parallelizes the X-rays emitted from the X-ray source 111 to increase intensity of the X-rays. The monochromator 113 is, for example, a double crystal spectrometer configured to further increase parallelism of X-rays incident from the multilayer film condensing mirror 112 to an extent that the lattice interval of elements to be measured can be obtained. The slit 114 limits a range in which the object 40 is irradiated with the X-rays incident from the monochromator 113. More specifically, the slit 114 limits the range in which the object 40 is irradiated with the X-rays to a width direction Hi and a depth direction Li. In other words, when the irradiation angle of X-rays with respect to the object 40 is assumed to be $\theta s$, the range in which the object 40 is irradiated with X-rays (irradiation region) becomes a rectangle region of Hi/sin $\theta s$ in an x direction and Li in a y direction. Note that in the following, the X-ray irradiation unit 11 has a configuration that makes the angle of incidence $\theta s$ of X-rays with respect to the object 40 changeable within a predetermined range. FIG. 2 is a schematic diagram describing a positional relationship among the X-ray irradiation unit, the object and the X-ray detection camera. As shown in FIG. 2, the X-ray irradiation unit 11 is, for example, allowed to rotate within an xz plane around a center position of the irradiation region of the object 40 with X-rays assuming that a distance Di from the slit 114 to the center position of the irradiation region of the object 40 is constant.

The X-ray detection camera 14 receives diffraction X-rays generated from the object 40 and generates a signal corresponding to intensity of the received diffracted light. The X-ray detection camera 14 is constructed of a plurality of semiconductor detection elements (solid image pickup devices or the like) disposed in, for example, a two-dimensional array. Examples of the semiconductor detection elements used include CCD (charge coupled device) and CMOS image sensors. The diffraction X-rays generated with irradiation X-rays in the irradiation region of the object 40 are photoelectrically converted by the semiconductor detection element disposed in a projection region of the X-ray detection camera 14 and outputted as imaging signals.

As shown in FIG. 2, the X-ray detection camera 14 is, for example, allowed to rotate within the xz plane around the center position of the irradiation region of the object 40 with X-rays assuming that a distance Do from the center position of the irradiation region of the object 40 to the projection region of the X-ray detection camera 14 is constant. More specifically, the position of the X-ray detection camera 14 is adjusted in accordance with a rotating state of the X-ray irradiation unit 11 so that an angle $\theta c$ formed by the direction of X-rays with which the object 40 is irradiated and a line connecting the center position of the irradiation region of the object 40 with X-rays and the center position of the projection region of the X-ray detection camera 14 becomes a constant angle.

The object stage 12 is allowed to move in two directions orthogonal to each other (x direction, y direction) and parallel to the surface of the object stage 12 by the stage drive unit 13 such as a motor. By moving the object stage 12 in the x direction and/or the y direction, it is possible to scan the irradiation region of the object 40. As shown in FIG. 2, the object stage 12 is allowed to rotate at a predetermined angle $\phi$ within an xy plane.

The control unit 15 controls operation of the entire X-ray diffraction measuring apparatus 10. More specifically, the control unit 15 controls, for example, X-ray rotation of the X-ray irradiation unit 11 as the angle of incidence $\theta s$ changes or controls the rotation of the X-ray detection camera 14 as X-rays of the X-ray irradiation unit 11 rotate. The control unit 15 controls parameters or the like of each component constituting the X-ray irradiation unit 11 or further instructs the stage drive unit 13 to move the stage position (translation within the xy plane) or rotate (rotational movement within the xy plane) to adjust the position at which X-rays are made incident on the object 40.

The control unit 15 transmits location information of the object stage 12, that is, the incident position (coordinates) of X-rays on the object 40 to the analysis apparatus 20. The control unit 15 receives initial setting information for stress inspection and information on a change in setting contents in each step from the analysis apparatus 20.

The analysis apparatus 20 is, for example, a computer and includes a central processing unit (CPU) 21, a RAM 22 and a memory 23. The analysis apparatus 20 analyzes data inputted from the X-ray diffraction measuring apparatus 10 (electric signal with a magnitude corresponding to the detection intensity of diffracted light outputted for each pixel from the X-ray detection camera 14 and the incident position (coordinates, angle of incidence $\theta s$) of X-rays at the object 40 outputted from the control unit 15, and two-dimensionally detects a stress distribution of the object 40. The analysis apparatus 20 also outputs an instruction for a stress analysis to the X-ray diffraction measuring apparatus 10.

The CPU 21 operates according to a program stored in the memory 23 and controls each component of the analysis apparatus 20. The RAM 22 stores data inputted from the X-ray diffraction measuring apparatus 10 and stores results of executing a program, which will be described later.

The memory 23 stores distortion analysis software 231 configured to operate the X-ray diffraction measuring apparatus 10 and measure a desired stress distribution. The distortion analysis software 231 is read and loaded into the RAM 22, executed by the CPU 21, and the stress distribution in the object 40 is thereby measured and observed as two-dimensional mapping information. Note that the analysis apparatus 20 may be configured so that one or more processors (not shown) configured as hardware perform operation to be realized by the distortion analysis software 231. The processor that performs operation to be realized by the distortion analysis software 231 may be, for example, a processor configured as an electronic circuit or a processor constructed of an integrated circuit such as an FPGA (field programmable gate array).

Figure 3:
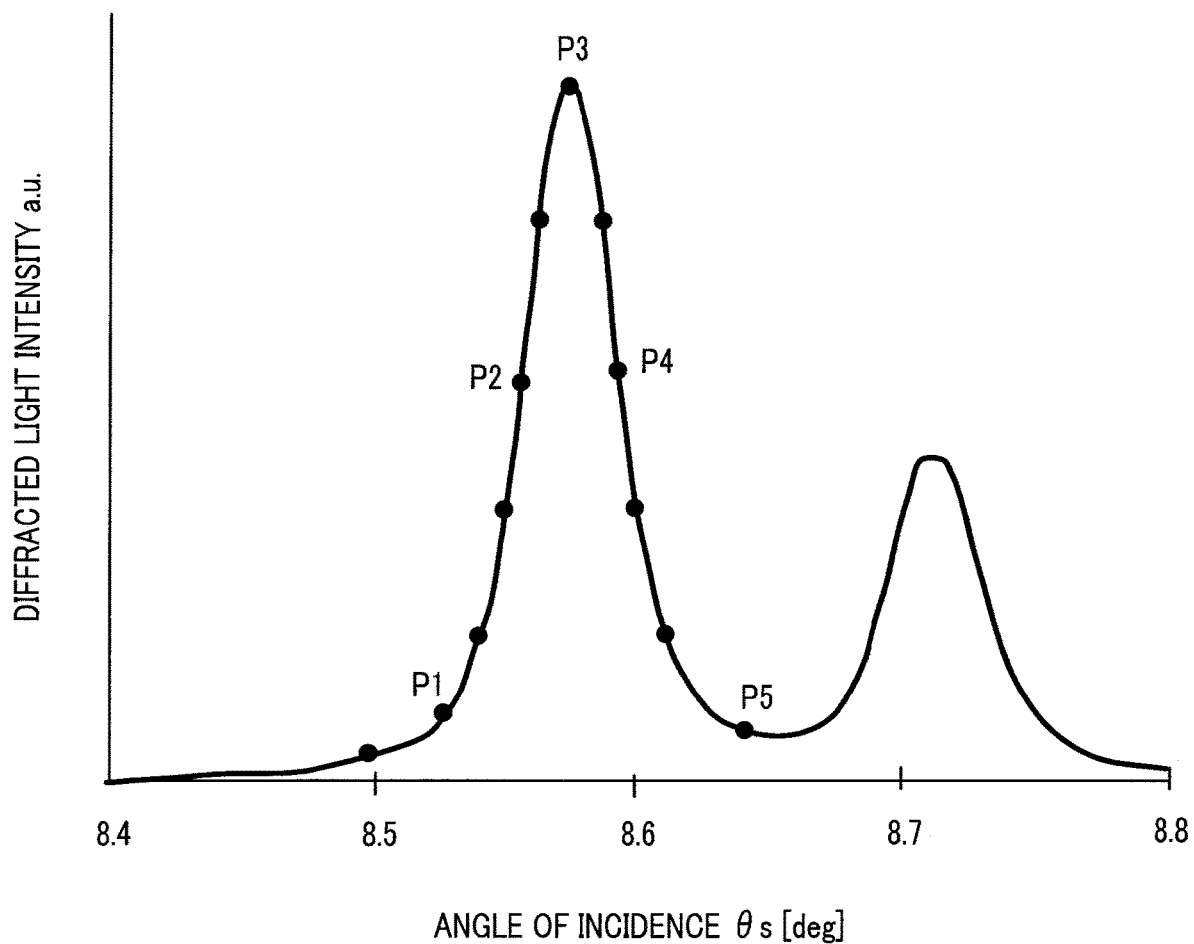
FIG. 3 is a diagram describing a variation in diffracted light intensity versus an angle of incidence of X-rays.
Figure 4:
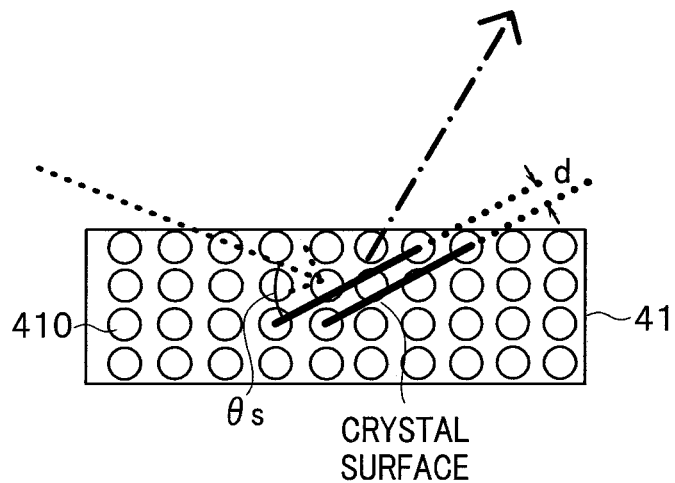
FIG. 4 is a diagram describing a variation in a crystalline structure of an object by distortion.
Figure 5:
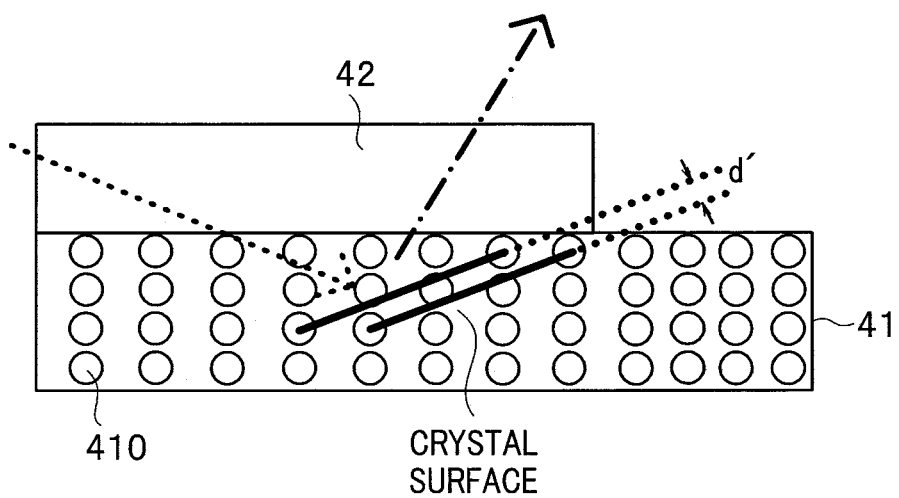
FIG. 5 is a diagram describing a variation in a crystalline structure of an object by distortion.

Next, principles of stress distribution measurement of the object 40 according to the present embodiment will be described. FIG. 3 is a diagram describing a variation in diffracted light intensity versus an angle of incidence of X-rays. FIG. 3 illustrates a measurement result of one given pixel of the X-ray detection camera 14. FIG. 4 and FIG. 5 are diagrams describing a variation in a crystalline structure of an object by distortion. FIG. 4 is a diagram describing a crystalline structure of the object without distortion and FIG. 5 is a diagram describing a crystalline structure of the object with distortion. As shown in FIG. 4, in a crystal 41 constituting the object 40 without distortion, atoms (or molecules) 410 constituting the crystal are regularly arranged at predetermined intervals. For example, when the object 40 is a silicon single crystal, a lattice interval (surface interval) of silicon atoms on a reflecting surface (422) is 1.1085 Å. When monochromatic X-rays are made incident on a lattice surface of the object 40, with θs where a wavelength (λ) of incident X-rays, a surface interval (d) of a crystal surface of the object and an angle of incidence (θs) of the X-rays satisfy 2d sin θs=nλ, interference of X-rays reflected from the lattice surface of the object 40 increases mutual intensities. Therefore, a peak of diffracted light intensity is observed at θs. In other words, the angle θs (Bragg angle) at which the peak of diffracted light intensity is observed is uniquely determined by a crystalline structure of the object and a wavelength of the monochromatic X-rays.

As shown in FIG. 5, when a film 42 having a structure different from the structure of the crystal 41 is formed on the surface of the crystal 41 without distortion, the interval of atoms 410 in the crystal 41 is changed by stress of the film 42 formed on the surface. For example, when a film such as a silicon oxide film is formed on the surface of the silicon single crystal, the interval of silicon atoms in the silicon single crystal changes (d→d'). In other words, since the surface interval of the crystal surface of the object changes, the peak position of diffracted light intensity changes. More specifically, as shown in FIG. 5, when the overall lattice interval changes by a certain amount due to stress in a certain direction (although the lattice interval changes compared to the single crystal, the amount of change is constant within a measuring region per pixel), the peak position of diffracted light intensity is shifted. On the other hand, when the lattice interval irregularly changes or partially changes due to stress applied from a plurality of directions, a variation occurs in the peak position of diffracted light intensity in the measuring region per pixel, and so the full width at half maximum of diffracted light intensity increases.

Figure 6:
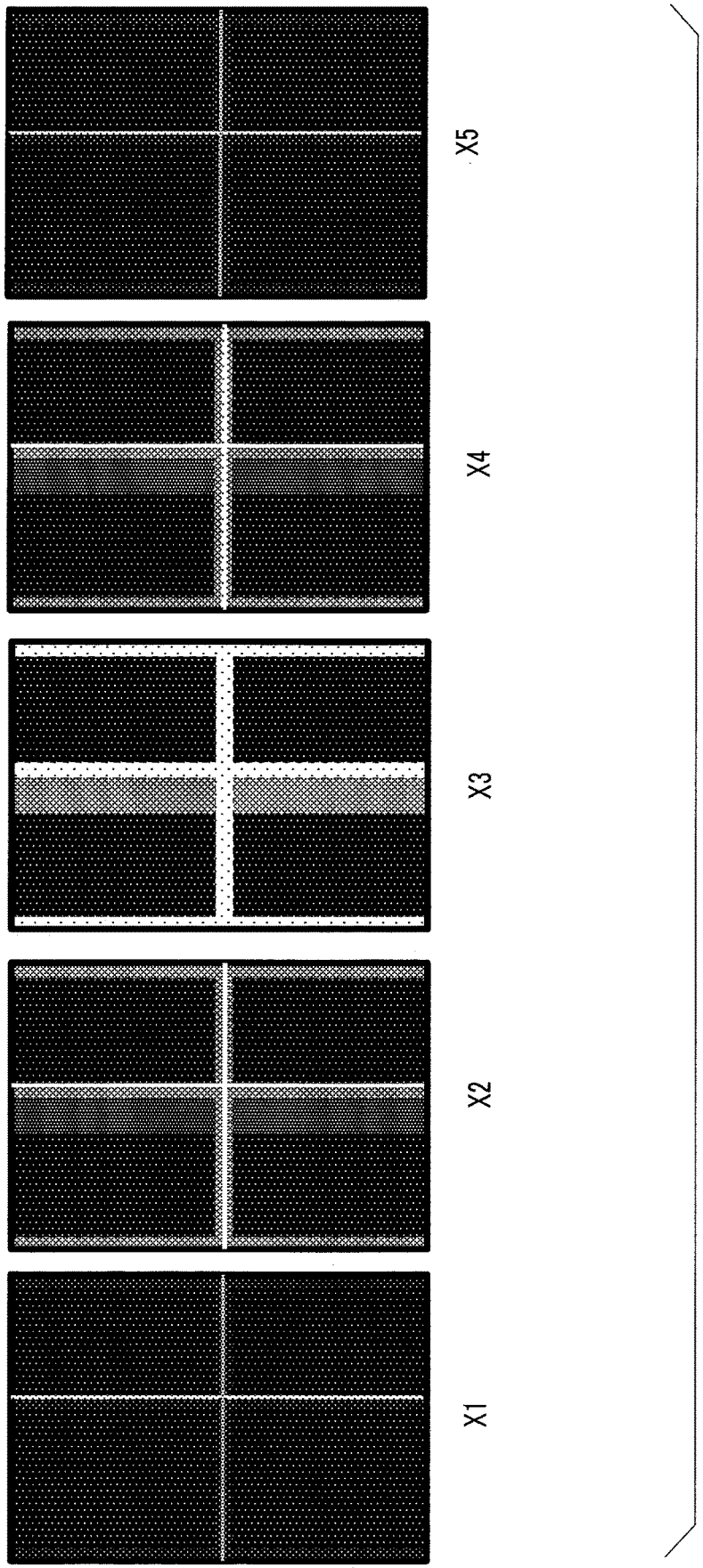
FIG. 6 is a diagram illustrating an example of an X-ray diffraction image of an object.

FIG. 6 is a diagram illustrating examples of X-ray diffraction images of an object. Assuming a semiconductor substrate on which a semiconductor device is formed as an object, FIG. 6 illustrates five X-ray diffraction images (images X1 to X5) obtained by measuring the same object at different angles of incidence. The image X1 is an image obtained as a result of measurement at the angle of incidence θs acquired at a point P1 in FIG. 3. Similarly, the image X2, the image X3, the image X4 and the image X5 are images obtained as a result of measurement at the angle of incidence θs acquired at points P2, P3, P4 and P5 in FIG. 3. The X-ray diffraction images shown in FIG. 6 express an intensity distribution of diffracted light obtained from the irradiation region of the object 40 in terms of brightness. In other words, pixels measured with large diffracted light intensity in the images are expressed by bright pixels (pixels with high brightness), whereas pixels measured with small diffracted light intensity are expressed by dark pixels (pixels with low brightness). Since semiconductor devices are provided with various kinds of films formed in various patterns on semiconductor substrate surfaces, the magnitude and direction of stress applied to the semiconductor substrates vary depending on the surface structures. Therefore, when intensity of diffracted light is two-dimensionally measured by scanning angles of incidence of X-rays, the diffracted light intensity varies from one location to another. Using this, in the present embodiment, a distortion distribution of an object is estimated by scanning angles of incidence and two-dimensionally measuring a variation in the diffracted light intensity.

Figure 7:
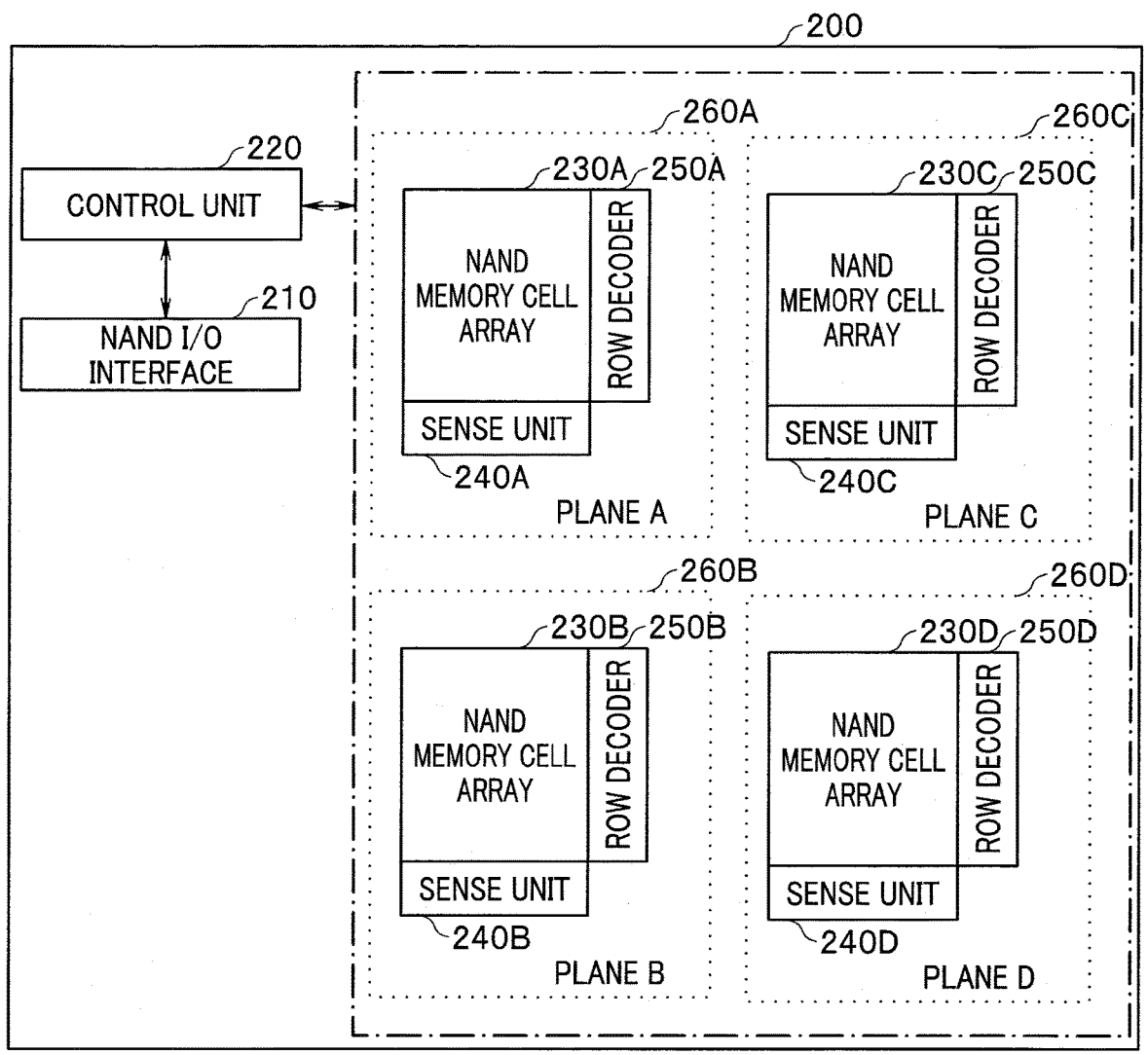
FIG. 7 is a block diagram illustrating a configuration example of a semiconductor device (non-volatile memory) to be an object.

Here, an example of a semiconductor device to be measured by the inspection apparatus 1 of the present embodiment will be described. FIG. 7 is a block diagram illustrating a configuration example of a semiconductor device (non-volatile memory) to be an object. A non-volatile memory 200 includes a NAND I/O interface 210, a control unit 220 and planes 260. The planes 260 are units that can be independently read, written or erased, and one or more planes 260 are disposed in the non-volatile memory 200. FIG. 7 illustrates a case where four planes 260 are disposed in the non-volatile memory 200. A plane 260A includes a NAND memory cell array (memory cell unit) 230A, a sense unit 240A and a row decoder 250A. Similarly, planes 260B, 260C and 260D include NAND memory cell arrays 230B, 230C and 230D, sense units 240B, 240C and 240D and row decoders 250B, 250C and 250D respectively. The non-volatile memory 200 is manufactured by dividing a plurality of semiconductor chips formed on a semiconductor substrate (e.g., silicon substrate) by a scribe line. Note that the term "scribe line" refers to a cutting region to divide the plurality of semiconductor chips formed on the semiconductor substrate and is a region like an "overlap width" provided between the semiconductor chips. The scribe line generally has a width of 100 μm or less.

The control unit 220 is configured to control operation of the non-volatile memory 200 based on a request inputted from a memory controller (not shown) via the NAND I/O interface 210. Hereinafter, the operation will be described using a case where reading or writing is performed from/to the plane 260A as an example. More specifically, when a write request is inputted, the control unit 220 controls the row decoder 250A and the sense unit 240A so as to write data to be written at a specified address on the NAND memory cell array 230A. When a read request is inputted, the control unit 220 performs control so as to read data to be read from the NAND memory cell array 230A and output the data to the memory controller (not shown) via the NAND I/O interface 210.

The row decoder 250A is configured to select the NAND memory cell array 230A in block units based on a row address inputted from the control unit 220 and apply a desired voltage to a word line.

When reading data, the sense unit 240A detects the data read from the NAND memory cell array 230A. When writing data, the sense unit 240A temporarily stores write data inputted from an external memory controller and transfers the write data to the NAND memory cell array 230A.

Figure 8:
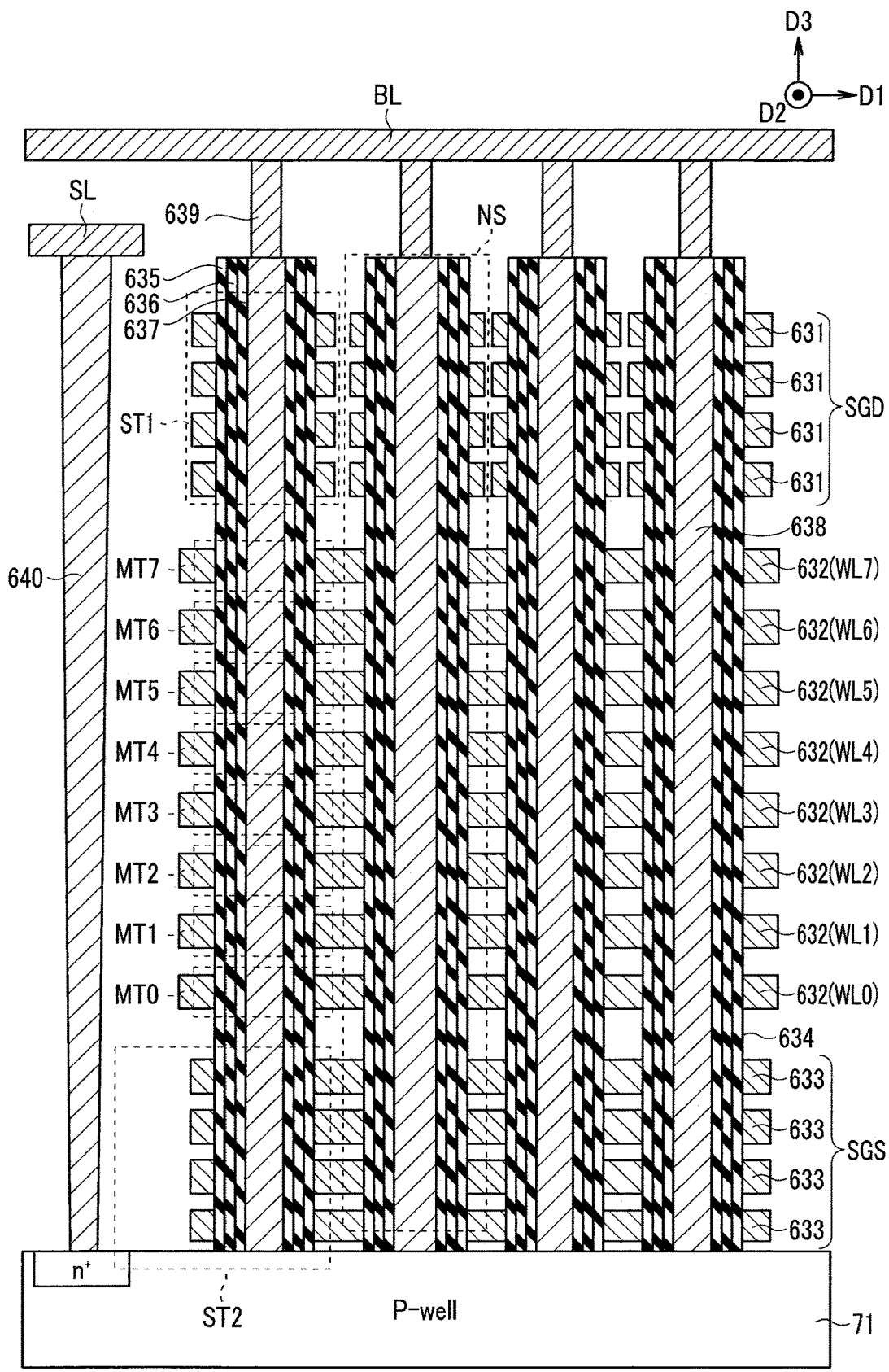
FIG. 8 is a cross-sectional view of a partial region of a NAND memory cell array of a three-dimensional structure.

FIG. 8 is a cross-sectional view of a partial region of a NAND memory cell array of a three-dimensional structure. In the following description, on a plane parallel to a surface of a semiconductor substrate 71, a direction in which a bit line BL extends is assumed to be D1. Furthermore, a direction parallel to the surface of the semiconductor substrate 71 and orthogonal to D1 is assumed to be D2. Furthermore, a direction orthogonal to the surface of the semiconductor substrate 71 is assumed to be D3.

The memory cell array 230 has a three-dimensional structure. As shown in FIG. 8, a plurality of NAND strings NS are formed on a p-type well region (P-well). In other words, a plurality of wiring layers 633 configured to function as select gate lines SGS, a plurality of wiring layers 632 configured to function as word lines WLi and a plurality of wiring layer 631 configured to function as select gate lines SGD are laminated on the p-type well region. Note that although FIG. 8 illustrates the structure in which eight wiring layers 632 that function as word lines WLi are laminated, NAND strings NS in which 48, 64, 96 or more wiring layers 632 are laminated are used nowadays.

A memory hole 634 penetrating the wiring layers 633, 632 and 631 and reaching the p-type well region is formed. A block insulating film 635, a charge storage layer 636 and a gate insulating film 637 are sequentially formed on a side surface of the memory hole 634, and furthermore, a conductive column 638 is embedded in the memory hole 634. The conductive column 638 is made of, for example, polysilicon and configured to function as a region in which a channel is formed during operations of a memory cell transistor MT and selection transistors ST1 and ST2 included in the NAND string NS.

In each NAND string NS, the selection transistor ST2, a plurality of memory cell transistors MT and the selection transistor ST1 are formed on the p-type well region. A wiring layer configured to function as the bit line BL is formed above the conductive column 638. A contact plug 639 connecting the conductive column 638 and the bit line BL is formed at a top end of the conductive column 638.

Furthermore, an n+-type impurity diffusion layer and a p+-type impurity diffusion layer are formed within a surface of the p-type well region. A contact plug 640 is formed on the n+-type impurity diffusion layer and a wiring layer configured to function as a source line SL is formed on the contact plug 640.

A plurality of the configurations shown in FIG. 8 described so far are arranged in a depth direction (D2 direction) of a sheet surface in FIG. 8 and one string unit SU is formed of a plurality of NAND string sets lining up in a row in the depth direction.

Figure 9:
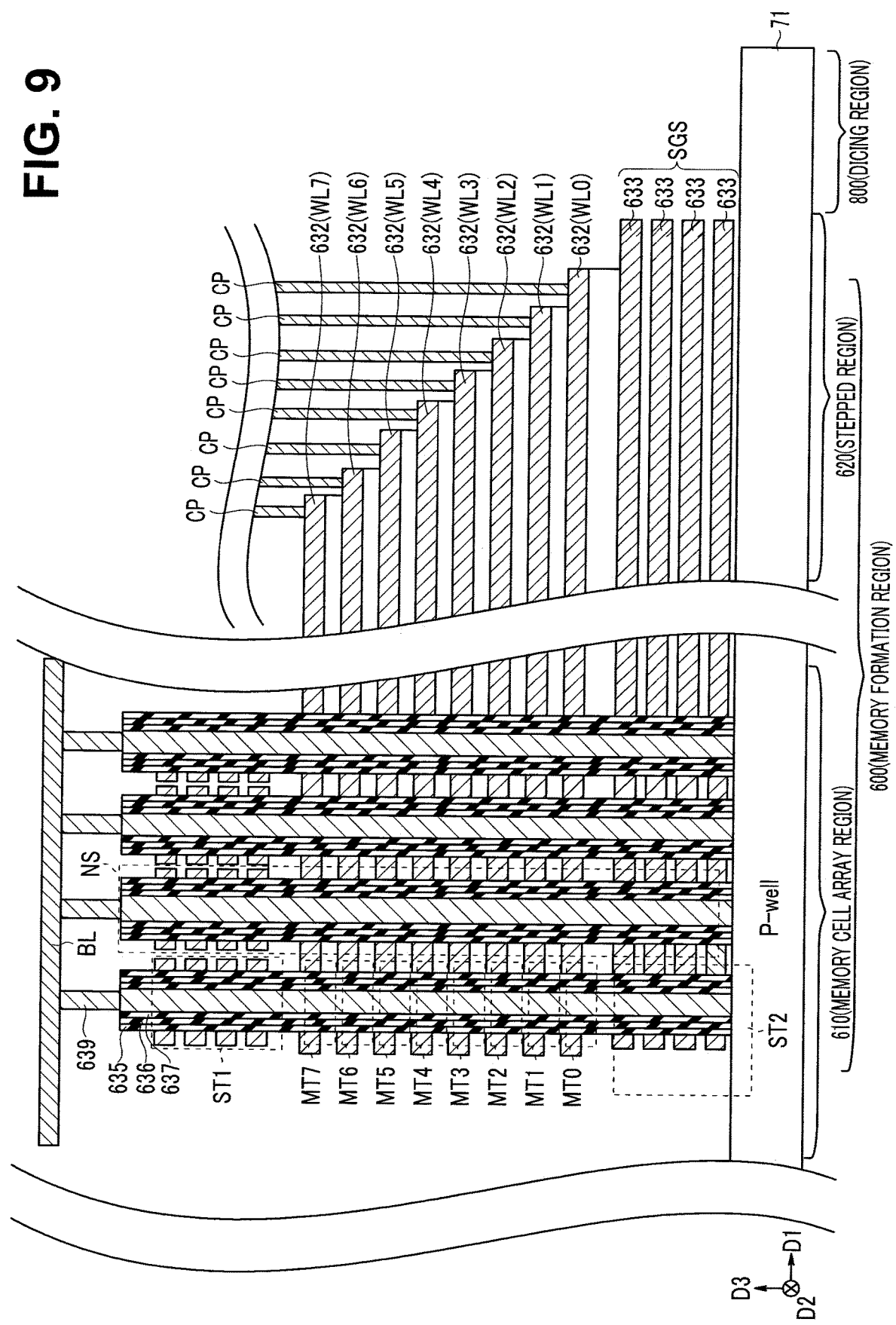
FIG. 9 is a cross-sectional view of a memory cell array of a NAND memory and a partial region of a periphery of the memory cell array.

FIG. 9 is a cross-sectional view of a memory cell array of the NAND memory and a partial region of a periphery of the memory cell array. As described above, generally, when a semiconductor device is manufactured, a plurality of semiconductor devices are formed on one semiconductor substrate 71. When the formation of the semiconductor device is completed, the semiconductor devices are disconnected from one another to obtain individual semiconductor devices. Therefore, a dicing region 800 (region cut using a dicing saw to disconnect neighboring semiconductor devices from each other, which is synonymous with the scribe line) is provided so as to surround the region (memory formation region) 600 in which the semiconductor device is formed on the semiconductor substrate 71.

FIG. 9 illustrates a region in which the memory formation region 600 and the dicing region 800 are disposed next to each other in the D1 direction. In other words, the two semiconductor devices 200 are disposed adjacent to each other in the D1 direction and FIG. 9 illustrates a partial region of one semiconductor device 200 and a partial region of a scribe line in a pattern in which the scribe line extending in the D2 direction is formed between the two semiconductor devices 200.

The memory formation region 600 includes a memory cell array region 610 and a stepped region 620. The memory cell array 230 having a three-dimensional structure as shown in FIG. 8 is formed in the memory cell array region 610. In other words, in the memory cell array region 610, a plurality of different films are laminated in multiple layers in the D3 direction. A specific pattern (e.g., the memory hole 634) is periodically disposed on a plane perpendicular to the D3 direction.

The stepped region 620 is a region where contact plugs CP connecting a wiring layer 632 constituting the memory cell array 230 and a wiring layer (not shown) are formed. When seen in the D3 direction, the wiring layer 632 is patterned so that the length of each end portion becomes shorter from a word line WL0 positioned at a lower layer toward a word line WL7 positioned at an upper layer in order to dispose each contact plug CP to be connected to each word line WLi so as not to overlap each other. In other words, a region (step) where no word line WL (i+1) is laminated is formed on a top surface of each word line WLi and the contact plug CP is connected to the step. Just like the memory cell array region 610, the stepped region 620 is constructed of a plurality of different films laminated in multiple layers in the D3 direction, but the area of each layer decreases toward the top layer. When seen in the D1 direction, the closer to the memory cell array region 610, the more films are laminated, and the closer to the dicing region 800, the fewer films are laminated.

In the dicing region 800, the semiconductor substrate 71 is exposed and no film is formed in the D3 direction. Alternatively, a film different from the film of the memory cell array region 610 may be formed on the semiconductor substrate 71 in the dicing region 800.

Figure 10:
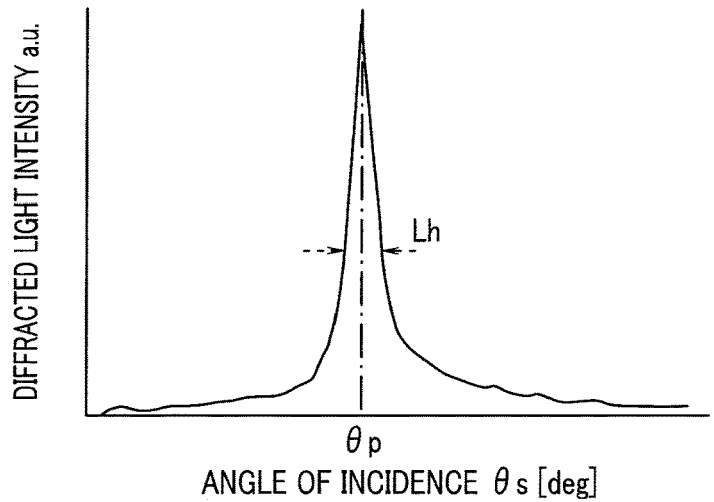
FIG. 10 is a diagram describing a variation in diffracted light intensity versus an angle of incidence of X-rays, an object of which is the semiconductor device shown in FIG. 9.
Figure 11:
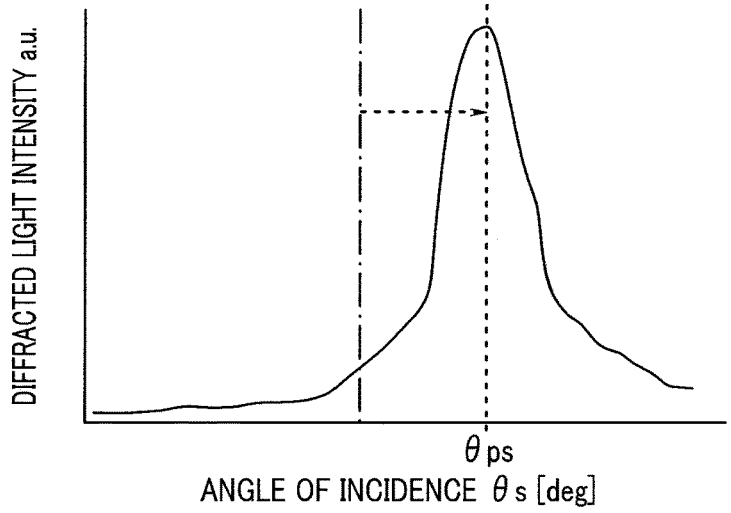
FIG. 11 is a diagram describing a variation in diffracted light intensity versus an angle of incidence of X-rays, an object of which is the semiconductor device shown in FIG. 9.
Figure 12:
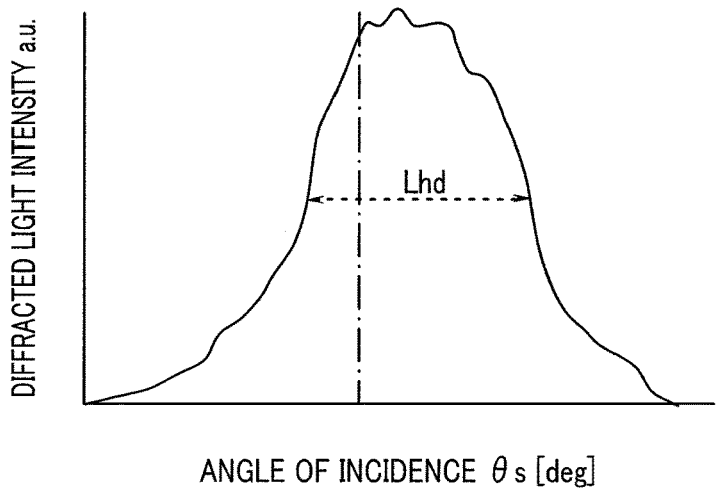
FIG. 12 is a diagram describing a variation in diffracted light intensity versus an angle of incidence of X-rays, an object of which is the semiconductor device shown in FIG. 9.

FIGS. 10 to 12 are diagrams describing a variation in diffracted light intensity versus an angle of incidence of X-rays, an object of which is the semiconductor device shown in FIG. 9. FIG. 10 illustrates a variation in diffracted light intensity in the memory cell array region 610. FIG. 11 illustrates a variation in diffracted light intensity in the stepped region 620. Furthermore, FIG. 12 illustrates a variation in diffracted light intensity in the dicing region 800.

As shown in FIG. 10, suppose that a peak angle of diffracted light intensity in the memory cell array region 610 is θp and a full width at half maximum is Lh. As shown in FIG. 11, in the stepped region 620, the peak angle θps of diffracted light intensity is shifted in a positive direction with respect to the peak angle θp in the memory cell array region 610. As shown in FIG. 12, a full width at half maximum Lhd in the dicing region 800 is larger than the full width at half maximum Lh in the memory cell array region 610.

Thus, regions differing in the type of laminated film, the number of laminated films and the pattern are formed in the semiconductor device 200. Since the magnitude and direction of distortion generated in the semiconductor substrate 71 differ among these regions, different variation characteristics (rocking curves) of diffracted light intensity are detected. The inspection apparatus 1 of the present embodiment can measure the variation characteristic of diffracted light intensity in the two-dimensional region at high resolution and in a non-destructive way, and is therefore suitable for a stress inspection of the semiconductor substrate 71 in which the semiconductor device 200 is formed.

Figure 13:
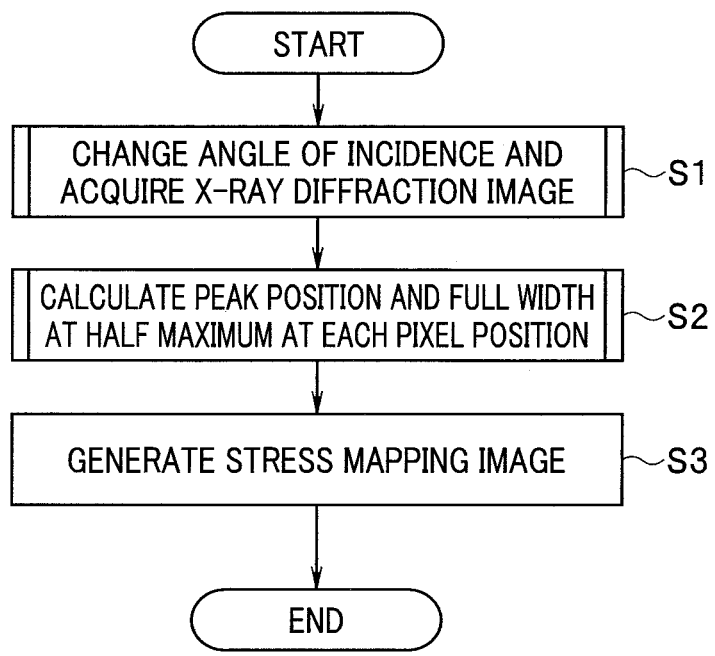
FIG. 13 is a flowchart describing an example of a procedure of a method for inspecting a semiconductor device according to the embodiment.

Next, a procedure of a method for inspecting a semiconductor device according to the present embodiment will be described using FIG. 13. FIG. 13 is a flowchart describing an example of a procedure of the method for inspecting a semiconductor device according to the present embodiment. Prior to an inspection, a crystal surface to be measured of the object 40 is determined. Moreover, monochromatic X-rays (wavelength) to be radiated are determined. For example, when the object 40 is the semiconductor substrate 71 (made of a silicon single crystal) on which the semiconductor device 200 is formed, and stress in the D1 direction or the D2 direction, which is a direction parallel to the substrate surface, is measured, a (422) surface as a crystal surface becomes a measurement target. For example, Kα1 or Kα2 of Cu is selected as monochromatic X-rays having a wavelength suitable for measurement of distortion of a (100) surface of silicon.

Note that when the silicon (422) surface is designated as a measurement target, it is possible to measure distortion in the D1 direction and distortion in the D2 direction separately. In other words, when distortion in the D1 direction is designated as a measurement target, the object 40 is set on the object stage 12 so that the D1 direction of the object 40 coincides with the x direction, which is a direction parallel to the direction of incident X-rays. When distortion in the D2 direction is designated as a measurement target, the object 40 is set on the object stage 12 so that the D2 direction of the object 40 coincides with the x direction.

Figure 14:
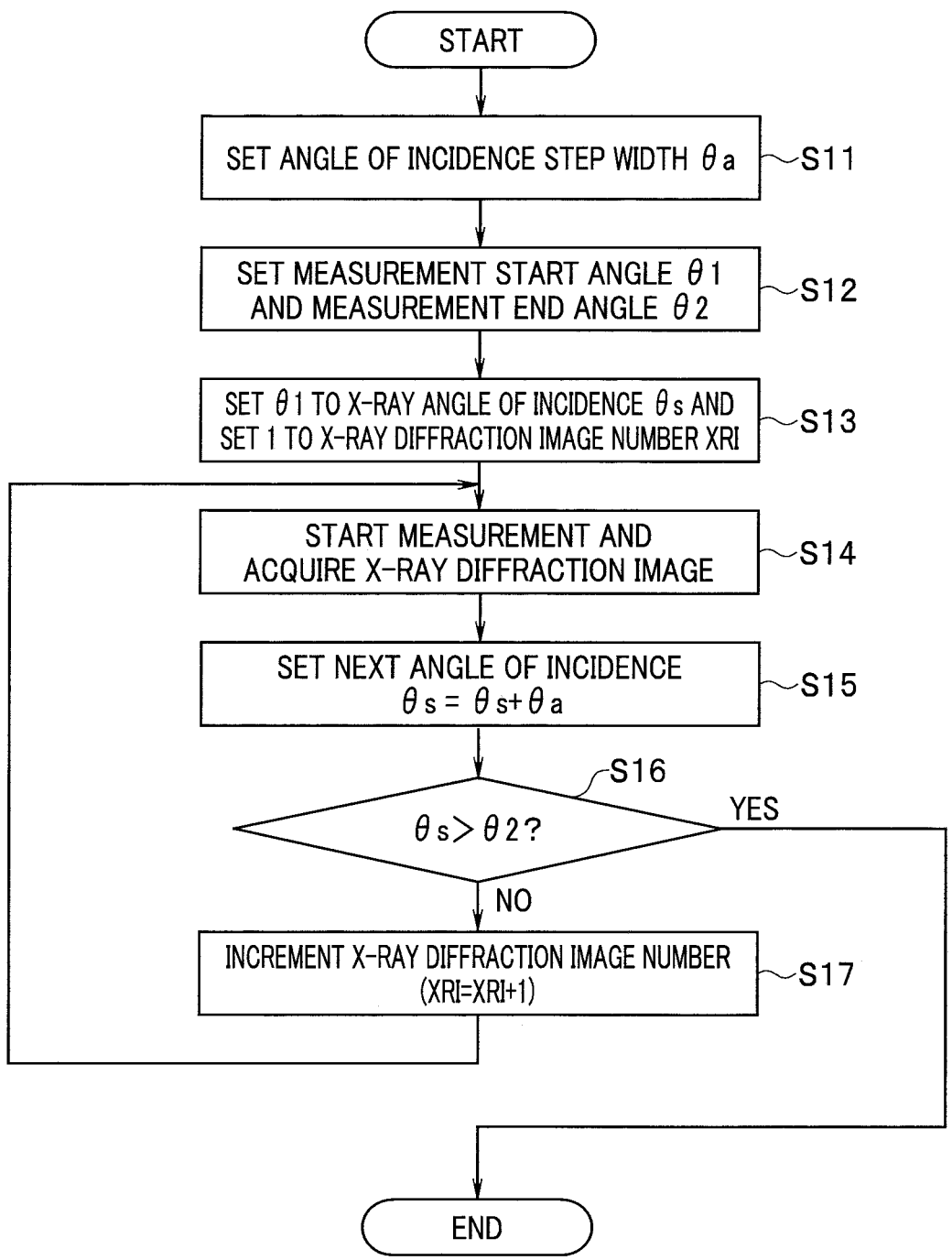
FIG. 14 is a flowchart describing an example of a procedure for acquiring X-ray diffraction images in an inspection target region of an object.

First, the inspection target region of the object 40 is irradiated with X-rays by scanning the angle of incidence and an X-ray diffraction image is acquired (S1). A specific procedure in S1 will be described using FIG. 14. FIG. 14 is a flowchart describing an example of a procedure for acquiring X-ray diffraction images in the inspection target region of the object.

A step angle θa when scanning the angle of incidence of X-rays in the analysis apparatus 20 is set (S11). Next, a scan width (measurement start angle θ1 and measurement end angle θ2) of the angle of incidence of X-rays is set (S12). Angles θ1 and θ2 are normally set so that a Bragg angle of the crystal surface to be measured of the object 40 is included between the measurement start angle θ1 and the measurement end angle θ2.

Next, the position of the X-ray irradiation unit 11 is set so that the angle of incidence θs of X-rays becomes angle θ1 and the position of the X-ray detection camera 14 is set in accordance with a rotating state of the X-ray irradiation unit 11. The analysis apparatus 20 sets an image number XRI of the X-ray diffraction image to be acquired from now on to 1 (S13). Next, the X-ray irradiation unit 11 radiates X-rays to the object 40 and an image pickup device of the X-ray detection camera 14 receives the diffracted light generated from the object 40. An electric signal with a magnitude corresponding to diffracted light intensity detected by the X-ray detection camera 14 is inputted to the analysis apparatus 20. The analysis apparatus 20 generates an X-ray diffraction image based on the inputted electric signal (S14).

The analysis apparatus 20 sets an angle of incidence θs of X-rays to acquire the next X-ray diffraction image. More specifically, the step angle θa set in S11 is added to the currently set angle of incidence θs, which is designated as the next angle of incidence θs (S15). The analysis apparatus 20 compares the next angle of incidence θs set in S15 with the measurement end angle θ2, and ends the acquisition of the X-ray diffraction image when the angle of incidence θs is larger than the measurement end angle θ2 (S16, YES).

On the other hand, when the angle of incidence θs is equal to or less than the measurement end angle θ2 (S16, NO), an image number XRI of an X-ray diffraction image to be acquired from now on is incremented (S17), and returning to S14, X-ray diffraction measurement is continued. Following the above-described procedure, an X-ray diffraction image of the object 40 is acquired for each step angle θa from the angle of incidence θ1 to θ2.

Returning to FIG. 12, when S1 ends, the analysis apparatus 20 calculates a peak position and a full width at half maximum of diffracted light for each pixel position (S2). A specific procedure of S2 will be described using FIG. 15.

Figure 15:
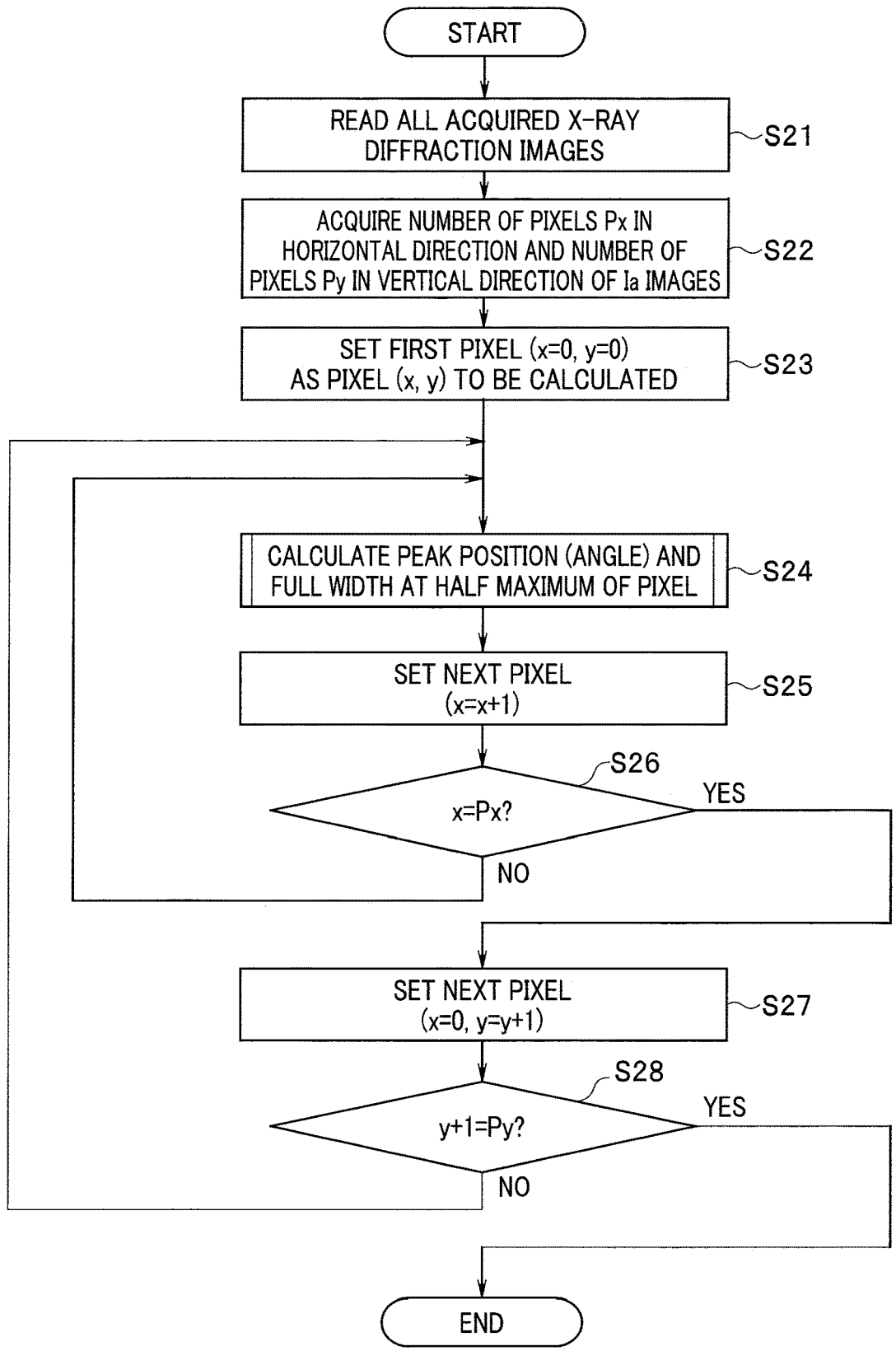
FIG. 15 is a flowchart describing an example of a procedure for acquiring a variation characteristic of diffracted light intensity in the inspection target region of the object.

FIG. 15 is a flowchart describing an example of a procedure for acquiring a variation characteristic of diffracted light intensity in the inspection target region of the object.

First, the analysis apparatus 20 reads all the X-ray diffraction images acquired in S1 (S21). Next, the analysis apparatus 20 acquires the number Ia of X-ray diffraction images acquired in S1, the number of pixels Px of each image in the horizontal direction (x direction) and the number of pixels Py in the vertical direction (y direction) (S22). A pixel Pc for which a variation characteristic of diffracted light intensity is to be calculated is set (S23). For example, a pixel at coordinates x=0, y=0 is set as the first pixel for characteristic calculation (Pc(x, y)=(0, 0)). Note that it is assumed that the left top side of the X-ray diffraction image corresponds to an origin, the right side in the x direction corresponds to an increasing direction and the down side in the y direction corresponds to an increasing direction, for example.

Figure 16:
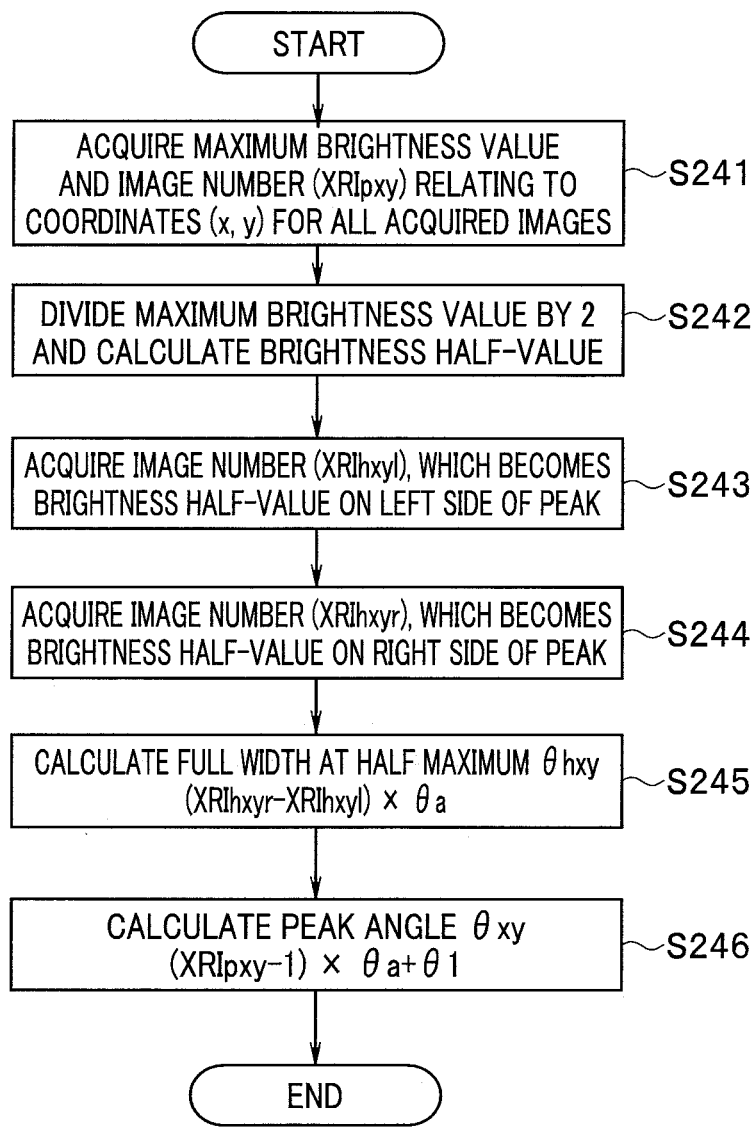
FIG. 16 is a flowchart describing an example of a procedure for acquiring a peak position and a full width at half maximum of diffracted light intensity.

Next, a peak position and a full width at half maximum of diffracted light intensity of the pixel for characteristic calculation are calculated (S24). A specific procedure in S24 will be described using FIG. 16. FIG. 16 is a flowchart describing an example of a procedure for acquiring a peak position and a full width at half maximum of diffracted light intensity.

Regarding all the images read in S21 in FIG. 15, a maximum brightness value of the pixel Pc for characteristic calculation is acquired first. An image number of the X-ray diffraction image, the maximum brightness value of which has been acquired is acquired (S241). For example, in S21, when 60 images (image number XRI=1 to 60) are acquired and (0, 0) is set as the pixel Pc for characteristic calculation, the brightness value of the pixel at the pixel position (0, 0) is acquired from among the 60 images. The brightness values at the pixel position (0, 0) of the 60 images are compared and if the brightness value of the image with an image number XRI=30 is maximum, an image number XRIpxy at which the maximum brightness value is acquired is assumed to be 30.

Next, the maximum brightness value acquired in S241 is divided by 2 to calculate a brightness half-value (S242). Next, an image number (XRIhxyl) corresponding to a brightness half-value on the left side of the peak is acquired (S243). More specifically, an image having a brightness value of a pixel Pc for characteristic calculation substantially equal to the brightness half-value calculated in S242 is extracted from among images with image numbers smaller than the image number XRIpxy. The image number of the extracted image is set to XRIhxyl. An image number (XRIhxyr) corresponding to the brightness half-value on the right side of the peak is acquired (S244). More specifically, an image having a brightness value of a pixel Pc for characteristic calculation substantially equal to the brightness half-value calculated in S242 is extracted from among images with image numbers larger than the image number XRIpxy. The image number of the extracted image is set to XRIhxyr.

Next, a full width at half maximum θhxy of a pixel Pc for characteristic calculation is calculated (S245). More specifically, the full width at half maximum θhxy is calculated by subtracting the image number XRIhxyl acquired in S243 from the image number XRIhxyr acquired in S244, and multiplying the difference by a step angle θa. Finally, a peak angle θxy is calculated (S246). More specifically, an angle of incidence θs of X-rays when the image number XRIpxy acquired in S241 is measured is calculated. In other words, the peak angle θxy is calculated by multiplying the value obtained by subtracting one from XRIpxy by the step angle θa and adding the result to the measurement start angle θ1.

Returning to FIG. 15, when S24 ends, the next pixel is set as a pixel Pc for characteristic calculation. For example, when calculating a characteristic by applying raster scanning to the X-ray diffraction image from the left top to the right bottom, a pixel at coordinates resulting from adding one to x coordinates of the current pixel Pc for characteristic calculation is designated as the next pixel Pc for characteristic calculation (S25). However, when the next pixel for characteristic calculation does not exist within a range of the X-ray diffraction images (in other words, the current pixel Pc for characteristic calculation is located at a right end of the row to which the pixel belongs) (S26, YES), a pixel on a first column of the next row is designated as the next pixel Pc for characteristic calculation (S27). On the other hand, when the next pixel Pc for characteristic calculation exists within the range of the X-ray diffraction images (S26, NO), S24 is executed for the next pixel Pc for characteristic calculation, and a peak position and a full width at half maximum of diffracted light intensity are calculated.

In S27, when the pixel designated as the next pixel Pc for characteristic calculation exists within the range of the X-ray diffraction images (S28, NO), S24 is executed for the next pixel Pc for characteristic calculation, and a peak position and a full width at half maximum of diffracted light intensity are calculated. On the other hand, when the pixel designated as the next pixel Pc for characteristic calculation does not exist within the range of the X-ray diffraction images in S27 (in other words, the current pixel Pc for characteristic calculation is located at the lowest row of the X-ray diffraction images) (S28, YES), the series of steps shown in FIG. 15, that is, S2 in FIG. 13 is ended.

Figure 17:
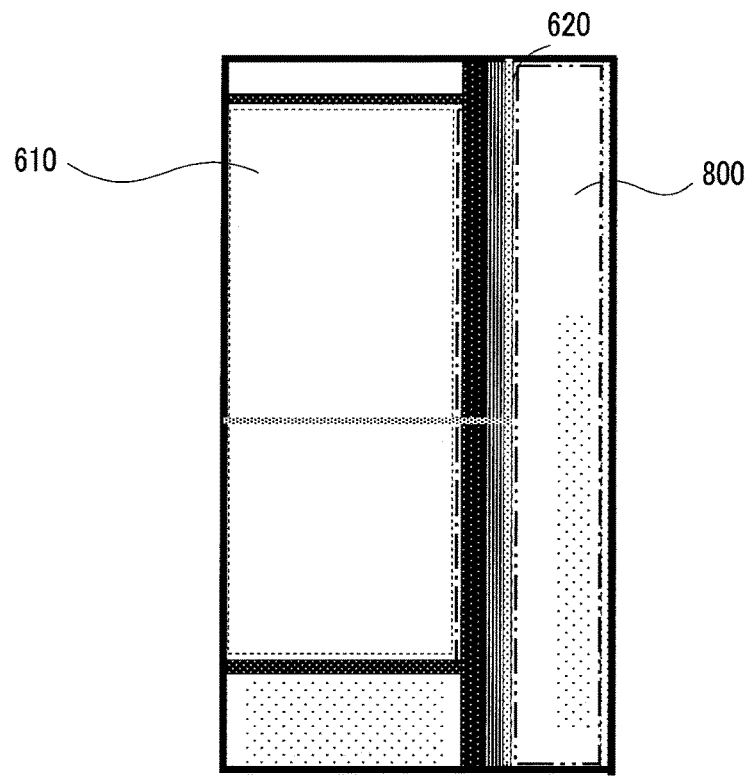
FIG. 17 is a diagram describing an image example of a stress mapping image relating to a peak position.
Figure 18:
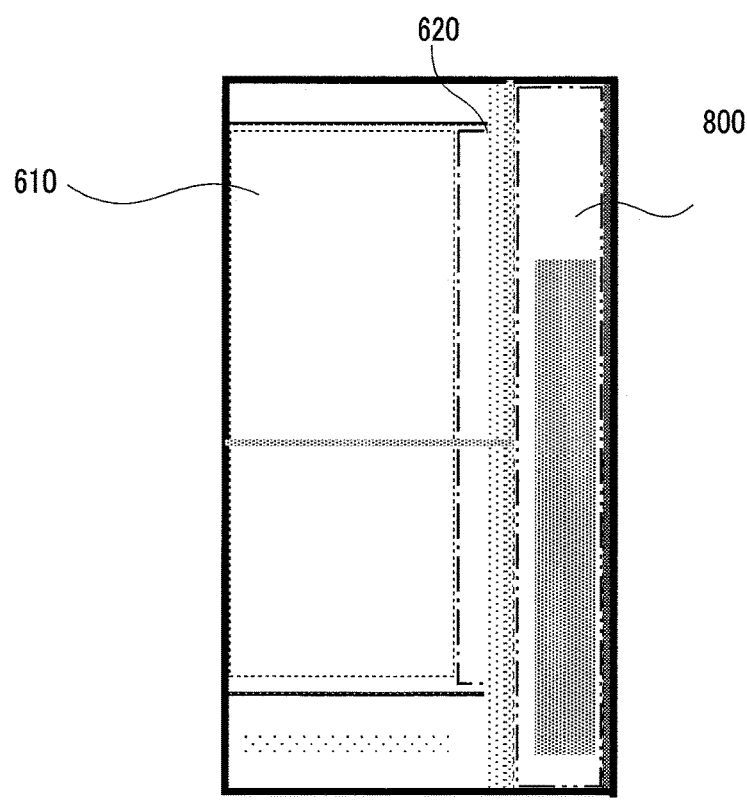
FIG. 18 is a diagram describing an image example of a stress mapping image relating to a full width at half maximum.

Returning to FIG. 13, a stress mapping image in the inspection target region of the object 40 is finally generated using the value calculated in S2 (S3). FIG. 17 is a diagram describing an image example of a stress mapping image relating to a peak position. FIG. 18 is a diagram describing an image example of a stress mapping image relating to a full width at half maximum. The stress mapping image can express the magnitude of a difference with respect to a reference value such as an average value of the entire image in a brightness value. For the image relating to the peak position shown in FIG. 17, for example, an average of peak positions (average peak position) of all pixels in the X-ray diffraction image is calculated and the magnitude of a difference in the peak position of each pixel with respect to the average peak position is expressed in a brightness value. The larger the amount of peak shift, the larger the brightness value is expressed. For the image relating to the full width at half maximum shown in FIG. 18, for example, an average of full width at half maximum (average full width at half maximum) of all pixels in the X-ray diffraction image is calculated and the magnitude of a difference in full width at half maximum of each pixel with respect to the average full width at half maximum is likewise expressed in a brightness value. The larger the full width at half maximum, the larger the brightness value is expressed.

Note that it is also possible to display positivity or negativity of a difference with respect to an average value in different colors. For example, a case where the peak position is smaller than the average value may be displayed in blue and a case where the peak position is larger than the average value may be displayed in red, and it is thereby possible to identify at a glance that stress is working on a red part in a direction in which the surface interval increases compared to the average surface interval of the object 40 and that stress is working on a blue part in a direction in which the surface interval decreases.

FIG. 17 and FIG. 18 illustrate an image when the semiconductor device 200 having the structure shown in FIG. 9 is inspected as the object 40 and in the drawing, a region enclosed by a dotted line corresponds to the memory cell array region 610, a region enclosed by a single-dot dashed line corresponds to the stepped region 620, and a region enclosed by a two-dot dashed line corresponds to the dicing region 800. As shown in FIG. 17 and FIG. 18, it is observable that distortion is generated in accordance with the structure (film structure, pattern structure) of the semiconductor device 200 and regions where peak shifts have occurred and regions where the full width at half maximum is increasing are localized. For example, steps are formed in the stepped region 620 only on one side in the x direction, and so stress is applied in a certain direction (x direction). Therefore, the stepped region 620 has a large amount of peak shift. By contrast, no pattern is formed on a surface of the dicing region 800 and so the lattice interval is irregularly distorted in accordance with the pattern formed in the periphery. Therefore, the full width at half maximum increases.

Note that when creating a stress mapping image, for comparison of relative distortion within the surface, it is possible to use the image number at which a peak position is detected (image number XRIpxy acquired in S241 in FIG. 16) or the number of images included in the range of a full width at half maximum (XRIhxyr−XRIhxyl calculated in S245 in FIG. 16) instead of using the values obtained by calculating the peak position and the full width at half maximum as angles.

It is possible to measure a peak angle of diffracted light intensity of a standard sample with no stress applied (e.g., semiconductor substrate formed of a silicon single crystal before the formation of the semiconductor device 200), compare this peak angle with a peak angle of diffracted light intensity for each pixel of the object 40, evaluate by distinguishing whether the stress applied to each region of the object 40 is tensile stress or compression stress. In other words, if the stress is tensile stress, the surface interval of the crystal lattice is broadened, and so the peak angle is reduced. If the stress is compression stress, the surface interval of the crystal lattice is narrowed, and so the peak angle increases. In the stress mapping image, for example, tensile stress and compression stress are displayed in different colors, and it is thereby possible to make not only the stress magnitude distribution but also the type of stress visually easier to understand.

Moreover, if a relationship between a peak angle and magnitude of stress is acquired in advance using a standard sample, the magnitude of stress of which is known, it is also possible to convert the peak angle for each pixel acquired by the inspection apparatus of the present embodiment to the magnitude of stress.

As described above, according to the present embodiment, it is possible to provide an inspection apparatus 1 and an inspection method which can inspect stress in the semiconductor substrate 71 in which the semiconductor device 200 is formed in a non-destructive way and at high resolution.

Note that although a case has been described above where intensity of diffracted light reflected from the object 40 is measured using a silicon crystal surface (422) according to a reflection method, the intensity of diffracted light may also be measured using, for example, a crystal surface (200)

parallel to the D3 direction according to a transmission method. When the crystal surface (200) is used, stress including no D3 direction component can be measured, and it is thereby possible to inspect stress only in a direction parallel to the surface of the substrate 71 (D1 direction). Using the crystal surface (200) makes it possible to generate a stress mapping image in the depth direction from the surface of the substrate 71. Furthermore, by moving the position in the D1 direction in which X-rays are radiated and generating a plurality of stress mapping images to stack the generated images, it is also possible to generate three-dimensional stress mapping images.

Furthermore, the structure of the semiconductor device, which is the object 40 is not limited to the above-described structure. The inspection apparatus 1 of the present embodiment is applicable to inspections of semiconductor devices of various structures.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. An apparatus for inspecting a semiconductor device comprising:
    an X-ray irradiation unit configured to make monochromatic X-rays obliquely incident on an object at a predetermined angle of incidence, the object being a semiconductor device, the semiconductor device including a semiconductor substrate, a predetermined pattern being formed on a surface of the semiconductor substrate;
    a detection unit configured to detect observed X-rays observed from the object when the monochromatic X-rays are made obliquely incident using a plurality of two-dimensionally disposed photodetection elements;
    an analysis unit configured to generate X-ray diffraction images obtained by photoelectrically converting the observed X-rays; and
    a control unit configured to control the X-ray irradiation unit to change the angle of incidence of the monochromatic X-rays on the object and change a detection angle of the observed X-rays by the plurality of photodetection elements in the detection unit in accordance with the angle of incidence, wherein
    the detection unit detects the observed X-rays every time the angle of incidence is changed, the analysis unit acquires one of the X-ray diffraction images every time the angle of incidence is changed, and further the analysis unit identifies an X-ray diffraction image in which intensity of the observed X-rays becomes maximum as a maximum intensity image from among the X-ray diffraction images for each of pixels constituting the X-ray diffraction images and compares conditions for acquiring one of the X-ray diffraction images including at least the identified maximum intensity image among the pixels.

2. The apparatus for inspecting a semiconductor device according to claim 1, wherein the analysis unit compares peak angles, each of the peak angles being the angle of incidence at which the maximum intensity image is acquired for each of the pixels, among the pixels.

3. The apparatus for inspecting a semiconductor device according to claim 2, wherein the analysis unit calculates an average peak angle, the average peak angle being an average value of the peak angles of the pixels constituting the X-ray diffraction images, calculates peak angle differences, the peak angle differences being differences between the peak angles of the pixels and the average peak angle, and estimates a stress distribution of the object based on the peak angle differences.

4. The apparatus for inspecting a semiconductor device according to claim 3, wherein the analysis unit generates a stress mapping image having brightness values corresponding to the peak angle differences of the pixels.

5. The apparatus for inspecting a semiconductor device according to claim 1, wherein the analysis unit compares full width at half maximum angles of rocking curves of X-ray diffraction including maximum intensities of the observed X-rays among the pixels, each of the full width at half maximum angles being calculated for each of the pixels.

6. The apparatus for inspecting a semiconductor device according to claim 5, wherein the analysis unit calculates an average full width at half maximum angle, the average full width at half maximum angle being an average value of the full width at half maximum angles of the pixels constituting the X-ray diffraction images, calculates full width at half maximum angle differences, the full width at half maximum angle differences being differences between the full width at half maximum angles of the pixels and the average full width at half maximum angle, and estimates a stress distribution of the object based on the full width at half maximum angle differences.

7. The apparatus for inspecting a semiconductor device according to claim 6, wherein the analysis unit generates a stress mapping image having brightness values corresponding to the full width at half maximum angle differences of the pixels.

8. A method for inspecting a semiconductor device, comprising:
    making monochromatic X-rays obliquely incident on an object at a predetermined angle of incidence, the object being a semiconductor device, the semiconductor device including a semiconductor substrate, a predetermined pattern being formed on a surface of the semiconductor substrate;
    detecting observed X-rays observed from the object when the monochromatic X-rays are made obliquely incident using a plurality of two-dimensionally disposed photodetection elements; and
    generating X-ray diffraction images obtained by photoelectrically converting the observed X-rays, wherein
    the angle of incidence is variable, a detection angle of the observed X-rays is changed in accordance with the angle of incidence every time the angle of incidence is changed, one of the X-ray diffraction images corresponding to the angle of incidence is generated every time the angle of incidence is changed, an X-ray diffraction image in which intensity of the observed X-rays becomes maximum is further identified as a maximum intensity image from among the X-ray diffraction images for each of pixels constituting the X-ray diffraction image, and a stress distribution of the object is estimated based on a condition of each of the pixels when one of the X-ray diffraction images including at least the maximum intensity image being generated.

9. The method for inspecting a semiconductor device according to claim 8, wherein the stress distribution of the object is estimated based on peak angles, each of the peak angles being the angle of incidence at which the maximum intensity image is generated for each of the pixels.

10. The method for inspecting a semiconductor device according to claim 9, further comprising:
calculating an average peak angle, the average peak angle being an average value of the peak angles of the pixels constituting the X-ray diffraction images; and
calculating peak angle differences, the peak angle differences being differences between the peak angles of the pixels and the average peak angle,
the stress distribution of the object being estimated based on the peak angle differences.

11. The method for inspecting a semiconductor device according to claim 10, further comprising generating a stress mapping image having brightness values corresponding to the peak angle differences of the pixels.

12. The method for inspecting a semiconductor device according to claim 8, wherein the stress distribution of the object is estimated based on full width at half maximum angles of rocking curves of X-ray diffraction including maximum intensities of the observed X-rays, each of the full width at half maximum angles being calculated for each of the pixels.

13. The method for inspecting a semiconductor device according to claim 12, further comprising:
calculating an average full width at half maximum angle, the average full width at half maximum angle being an average value of the full width at half maximum angles of the pixels constituting the X-ray diffraction images; and
calculating full width at half maximum angle differences, the full width at half maximum angle differences being differences between the full width at half maximum angles of the pixels and the average full width at half maximum angle,
the stress distribution of the object being estimated based on the full width at half maximum angle differences.

14. The method for inspecting a semiconductor device according to claim 13, further comprising generating a stress mapping image including brightness values corresponding to the full width at half maximum angle differences of the pixels.

15. A method for inspecting a semiconductor device, comprising:
making monochromatic X-rays obliquely incident on an object at a predetermined angle of incidence, the object being a semiconductor device, the semiconductor device including a semiconductor substrate, a predetermined pattern being formed on a surface of the semiconductor substrate;
detecting observed X-rays observed from the object when the monochromatic X-rays are made obliquely incident using a photodetection element; and
generating X-ray diffraction images obtained by photoelectrically converting the observed X-rays, wherein
the angle of incidence is variable, a detection angle of the observed X-rays is changed in accordance with the angle of incidence every time the angle of incidence is changed, one of the X-ray diffraction images corresponding to the angle of incidence is generated every time the angle of incidence is changed, an X-ray diffraction image in which intensity of the observed X-rays becomes maximum is further identified as a maximum intensity image from among the X-ray diffraction images obtained, and stress applied to the object is estimated by comparing one of the X-ray diffraction images including at least the maximum intensity image with an X-ray diffraction measurement result obtained from a standard sample by an advance inspection.

16. The method for inspecting a semiconductor device according to claim 15, wherein the standard sample is made of a same material as a material of the semiconductor substrate and has zero stress.

17. The method for inspecting a semiconductor device according to claim 16, further comprising:
calculating a peak angle, the peak angle being the angle of incidence at which the maximum intensity image is generated; and
comparing the peak angle with a zero peak angle, the zero peak angle being the angle of incidence at which maximum intensity of the observed X-rays is obtained for the standard sample to thereby estimate the stress applied to the object.

18. The method for inspecting a semiconductor device according to claim 17, wherein it is estimated whether the stress applied to the object is tensile stress or compression stress based on whether the peak angle calculated is larger or smaller compared to the zero peak angle.

19. The method for inspecting a semiconductor device according to claim 15, further comprising:
calculating a first peak angle, the first peak angle being the angle of incidence at which the maximum intensity image is generated; and
acquiring in advance a relationship between a second peak angle calculated from the X-ray diffraction measurement result and a magnitude of stress for the standard sample, the magnitude of stress of which is known,
a magnitude of the stress applied to the object being estimated based on the relationship and the first peak angle.

20. The method for inspecting a semiconductor device according to claim 15, wherein the standard sample is the semiconductor substrate before the predetermined pattern is formed.

* * * * *